(12) United States Patent
O'Dowd et al.

(10) Patent No.: US 9,716,725 B2
(45) Date of Patent: Jul. 25, 2017

(54) EXECUTING A REMOTE CONTROL COMMAND TO ACTIVATE ONE OR MORE PERIPHERAL OF A MOBILE DEVICE IN A PERIPHERAL CONTROL DOMAIN

(71) Applicant: Green Hills Software, Inc., Santa Barbara, CA (US)

(72) Inventors: Daniel O'Dowd, Santa Barbara, CA (US); David Kleidermacher, Santa Barbara, CA (US); Thomas Cantrell, Oxnard, CA (US); Dennis Kou, Goleta, CA (US); Daniel Hettena, Princeton, NJ (US)

(73) Assignee: Green Hills Software, Inc., Santa Barbara, CA (US)

( * ) Notice: Subject to any disclaimer, the term of this patent is extended or adjusted under 35 U.S.C. 154(b) by 0 days.

(21) Appl. No.: 14/305,913

(22) Filed: Jun. 16, 2014

(65) Prior Publication Data

US 2015/0365432 A1    Dec. 17, 2015

(51) Int. Cl.
*H04L 29/06*    (2006.01)
*G06F 13/10*    (2006.01)
(Continued)

(52) U.S. Cl.
CPC ...... *H04L 63/1466* (2013.01); *G06F 9/45558* (2013.01); *G06F 13/10* (2013.01);
(Continued)

(58) Field of Classification Search
CPC ........... G06F 13/10; G06F 2009/45587; G06F 21/53; G06F 9/45558; H04L 63/10; H04L 63/1466
See application file for complete search history.

(56) References Cited

U.S. PATENT DOCUMENTS 7,493,654 B2 *  2/2009  Bantz .................... G06F 21/50
                                                   713/187
8,489,846 B1 *  7/2013  Jensen ................... G06F 21/74
                                                   711/173
(Continued)

FOREIGN PATENT DOCUMENTS

WO     2009120272 A1    10/2009

OTHER PUBLICATIONS

David Kleidermacher; Mike Kleidermacher, Embedded Systems Security, Apr. 25, 2012, Chapter 2, pp. 88-89; techbus. safaribooksonline.com/book/networking/security/9780123868862; retrieved on Dec. 9, 2015.*
(Continued)

*Primary Examiner* — Meng An
*Assistant Examiner* — Jorge A Chu Joy-Davila
(74) *Attorney, Agent, or Firm* — Barcelo, Harrison & Walker, LLP

(57) ABSTRACT

In certain embodiments, virtualization mechanisms used to defend against spying can also be used by attackers as a means to execute spying attacks more effectively. In certain embodiments, attack methods may use the virtualization mechanisms to surreptitiously activate input peripherals without the user's knowledge or authorization. In certain embodiments, a virtualized network interface may be employed in which all network traffic transiting a portable wireless system is routed through a remote control component within a peripheral control domain. The remote control component may be used by an attacker to communicate remotely with the portable device to send it peripheral activation commands. The remote control component can then activate peripherals via the peripheral access module without the user's or general-purpose operating system's knowledge or authorization. All other network traffic may be
(Continued)

passed through as normal and expected to the general-purpose operating system.

23 Claims, 3 Drawing Sheets

(51) Int. Cl.
 *G06F 9/455* (2006.01)
 *G06F 21/53* (2013.01)
(52) U.S. Cl.
 CPC .............. *G06F 21/53* (2013.01); *H04L 63/10* (2013.01); *G06F 2009/45587* (2013.01)

(56) References Cited

U.S. PATENT DOCUMENTS

| | | | | |
|---|---|---|---|---|
| 8,555,383 | B1* | 10/2013 | Marshall | H04L 63/20 713/151 |
| 8,726,405 | B1* | 5/2014 | Bailey | G06F 21/6218 726/26 |
| 2001/0042213 | A1* | 11/2001 | Jemes | H04L 29/06 726/3 |
| 2009/0125902 | A1* | 5/2009 | Ghosh | G06F 9/45533 718/1 |
| 2009/0172661 | A1 | 7/2009 | Zimmer et al. | |
| 2009/0193399 | A1* | 7/2009 | Mitran | G06F 9/45504 717/139 |
| 2010/0269171 | A1* | 10/2010 | Raz | G06F 17/00 726/13 |
| 2011/0145460 | A1 | 6/2011 | Conti et al. | |
| 2012/0054744 | A1 | 3/2012 | Singh et al. | |
| 2012/0054749 | A1 | 3/2012 | Noguchi | |
| 2014/0033316 | A1 | 1/2014 | Paczkowski et al. | |

OTHER PUBLICATIONS

PCT International Search Report dated Sep. 15, 2015 of International Application No. PCT/US15/35900. 13 Pages.

\* cited by examiner

EXECUTING A REMOTE CONTROL COMMAND TO ACTIVATE ONE OR MORE PERIPHERAL OF A MOBILE DEVICE IN A PERIPHERAL CONTROL DOMAIN

BACKGROUND OF THE DISCLOSURE

1. Field of the Disclosure

This disclosure generally relates to a portable wireless device solution that utilizes machine and input/output (I/O) virtualization techniques to effect spying attacks against general-purpose operating systems that commonly control portable wireless systems.

2. General Background

As portable wireless devices—such as smartphones, tablets, automotive infotainment systems, and so-called "Internet of Things" sensor-based devices—gain in popularity and use, they are increasingly being targeted by cyber attackers, who use device wireless communications pathways to launch remote attacks against the device's operating system. Many such operating systems, for example, iOS, Linux, Windows, and Android, are extremely complicated and have a lengthy track record of containing numerous exploitable security vulnerabilities. One family of attack vectors attempts to surreptitiously activate the portable device's input peripherals—such as audio, wireless communications (Wi-Fi, Bluetooth, etc.), and cameras—to gather locally available/generated private information without proper authorization (i.e. spy).

Portable device operating systems employ a number of security controls aimed at preventing unauthorized manipulation of input peripherals; however, the vulnerabilities in the operating systems themselves may render such controls impotent, since an attacker can simply use one of these vulnerabilities to commandeer the operating system and disable or otherwise circumvent its security controls.

BRIEF DESCRIPTION OF THE DRAWINGS

By way of example, reference will now be made to the accompanying drawings.

DETAILED DESCRIPTION

Figure 1:
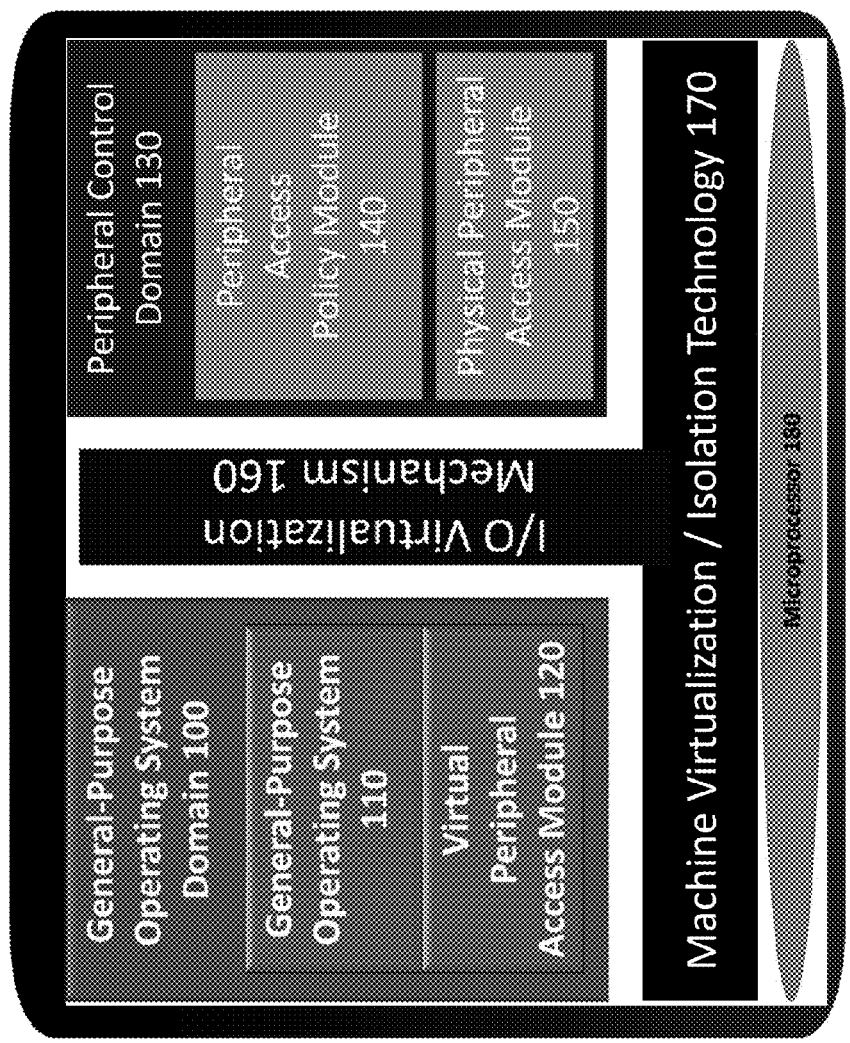
FIG. 1 illustrates a block diagram of a computing device employing virtualization techniques in accordance with certain embodiments.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

As shown in FIG. 1, certain embodiments employ an "out-of-band" mechanism in which the physical controls for activating input peripherals are removed from the portable device operating system domain 100 and placed instead under the control of a separate peripheral control domain 130, isolated from the general-purpose operating system domain 100 by a security kernel. The security kernel may employ machine virtualization 170 techniques that enable the peripheral control domain 130 to run alongside, but securely isolated from the general-purpose portable operating system 110 on the same general-purpose microprocessor 180 that would be used in a system that lacks the above features. No additional hardware may be required to implement the foregoing embodiments. An adjunct I/O virtualization mechanism 160 may also be included to abstract the guarded input peripheral interfaces, such that all attempts to turn them on from within the general-purpose operating system 110 are automatically redirected by the I/O virtualization mechanism 160 to the peripheral control domain 130. The peripheral control domain 130 may then conduct a policy-driven decision process via peripheral access policy module 140 to either allow, disallow, or request manual/explicit authorization of these access attempts. If access is permitted, such physical access may be performed by physical peripheral access module 150 within the peripheral control domain 130 and not within the general-purpose operating system domain 100. Because the access control and physical activation of input peripherals occur out-of-band from the operating system 100, these security-critical operations may be immune to vulnerabilities in the portable operating system 100.

In certain embodiments, the I/O manipulation mechanisms described in this disclosure do not impact the user experience; nothing in the user interface or in the behavior of general-purpose operating system application software is changed.

In certain embodiments, a portable computing device is disclosed comprising: at least one portable operating system domain; a peripheral control domain; a machine virtualization mechanism that isolates the at least one operating system domain from the peripheral control domain; and an I/O virtualization mechanism configured interposed between the operating system domain and the peripheral control domain and configured to translate operating system-originated input peripheral access requests and responses. The peripheral control domain may comprise: a physical peripheral control component; and a policy component for deciding how to handle input peripheral requests originating from the operating system. The machine virtualization mechanism may comprise a Type-1 hypervisor. The machine virtualization mechanism may comprise a Type-2 hypervisor. The machine virtualization mechanism may utilize ARM TrustZone. The machine virtualization mechanism may comprise a microkernel. The machine virtualization mechanism may comprises a separation kernel. The policy component may be configured to perform a local, autonomous decision regarding whether to allow input peripheral access based at least in part on at least one detectable condition. The at least one detectable condition may comprise at least one of a geolocation, one or more fixed policy settings, and an active connection to a trusted network. The policy component may be configured to request a user input to grant permission to access the input peripheral and the machine virtualization mechanism may be configured to render the portable operating system unable to overwrite or corrupt the input request process if the user input does not grant access. The policy component may receive a decision from a remote system. The remote system may comprise one of a manual control system or an automated control system. The policy component may record in an audit log all attempts to access input peripherals. The audit log may be locally stored within the portable device. The audit log may be transmitted to the remote system. The device may further comprise an input/data generation peripheral comprising at least one of: an audio device, a Bluetooth module, a near-field communications (NFC) module, a Wi-Fi module, a camera, a sensor, a global positioning system module, a ZigBee module and an IEEE 802.15.4 module. The I/O virtualization mechanism may comprise: one or more alternative virtualized controls that mimic one or more operating system peripheral controls for interfacing with the operating system. The I/O virtualization mechanism may comprise: a logical communications interface between the operating system domain and the peripheral control module domain for translating control requests and responses. The I/O virtualization mechanism may comprise at least one microprocessor trap to detect an attempt to access at least one physical peripheral. The machine virtualization mechanism may be configured to transfer control to the peripheral control module based on the detected attempt.

In certain embodiments, a portable computing device is disclosed comprising: at least one portable operating system module; a peripheral control module; a machine virtualization module that isolates the at least one operating system module from the peripheral control module; and an I/O virtualization module interposed between the operating system module and the peripheral control module and configured to translate operating system-originated input peripheral access requests and responses. The peripheral control module may comprise: a physical peripheral control module; and a policy module for deciding how to handle input peripheral requests originating from the operating system module. The machine virtualization module may comprise a Type-1 hypervisor. The machine virtualization module may comprise a Type-2 hypervisor. The machine virtualization module may utilize ARM TrustZone. The machine virtualization module may comprise one of a microkernel and a separation kernel. The policy module may be configured to perform a local, autonomous decision regarding whether to allow input peripheral access based at least in part on at least one detectable condition. The at least one detectable condition may comprise at least one of a geolocation, one or more fixed policy settings, and an active connection to a trusted network. The policy module may be configured to request a user input to grant permission to access the input peripheral and the machine virtualization module may be configured to render the portable operating system unable to overwrite or corrupt the input request process if the user input does not grant access. The policy module may receive a decision from a remote system. The remote system may comprise one of a manual control system or an automated control system. The policy module may record in an audit log all attempts to access input peripherals. The audit log may be locally stored within the portable device. The audit log may be transmitted to the remote system. The device may further comprise an input/data generation peripheral comprising at least one of: an audio device, a Bluetooth module, a near-field communications (NFC) module, a Wi-Fi module, a camera, a sensor, a global positioning system module, a ZigBee module and an IEEE 802.15.4 module. The I/O virtualization module may comprise: one or more alternative virtualized controls that mimic one or more operating system peripheral controls for interfacing to the operating system. The I/O virtualization module may comprise: a logical communications interface between the operating system module and the peripheral control module for translating control requests and responses. The I/O virtualization module may comprise at least one microprocessor trap to detect an attempt to access physical peripherals. The machine virtualization module may be configured to transfer control to the peripheral control module based on the detected attempt.

In certain embodiments, a method of domain isolation is disclosed, comprising: receiving an input peripheral access request from at least one portable device operating system; and performing a local, autonomous decision whether to allow input peripheral access based at least in part on at least one detectable condition, wherein the at least one portable device operating system is isolated from a peripheral access module domain by a machine virtualization module. The peripheral access module domain may comprise: a physical peripheral control module; and a policy module for deciding how to handle input peripheral requests originating from the operating system. The machine virtualization module may comprise a Type-1 hypervisor. The machine virtualization module may comprise a Type-2 hypervisor. The machine virtualization module may utilize ARM TrustZone. The machine virtualization module may utilize ARM TrustZone. The machine virtualization module may comprise one of a microkernel and a separation kernel. The at least one detectable condition may comprise at least one of a geolocation, one or more fixed policy settings, and an active connection to a trusted network. The method may further comprise: requesting a user input whether to allow the input peripheral access; and selectively permitting access to the input peripheral based at least in part on the user input. Selectively permitting access may comprise rendering the operating system unable to overwrite the input request process if the user input does not provide permission to access the input peripheral. The method may further comprise: providing one or more alternative virtualized controls that mimic one or more operating system peripheral controls for interfacing to the operating system. The method may further comprise: translating at least one control request and at least one response via a logical communications interface between the operating system domain and the peripheral control module domain. The method may further comprise: detecting an attempt to access at least one physical peripheral; and transferring control of the at least one physical peripheral to the peripheral access module domain.

Figure 2:
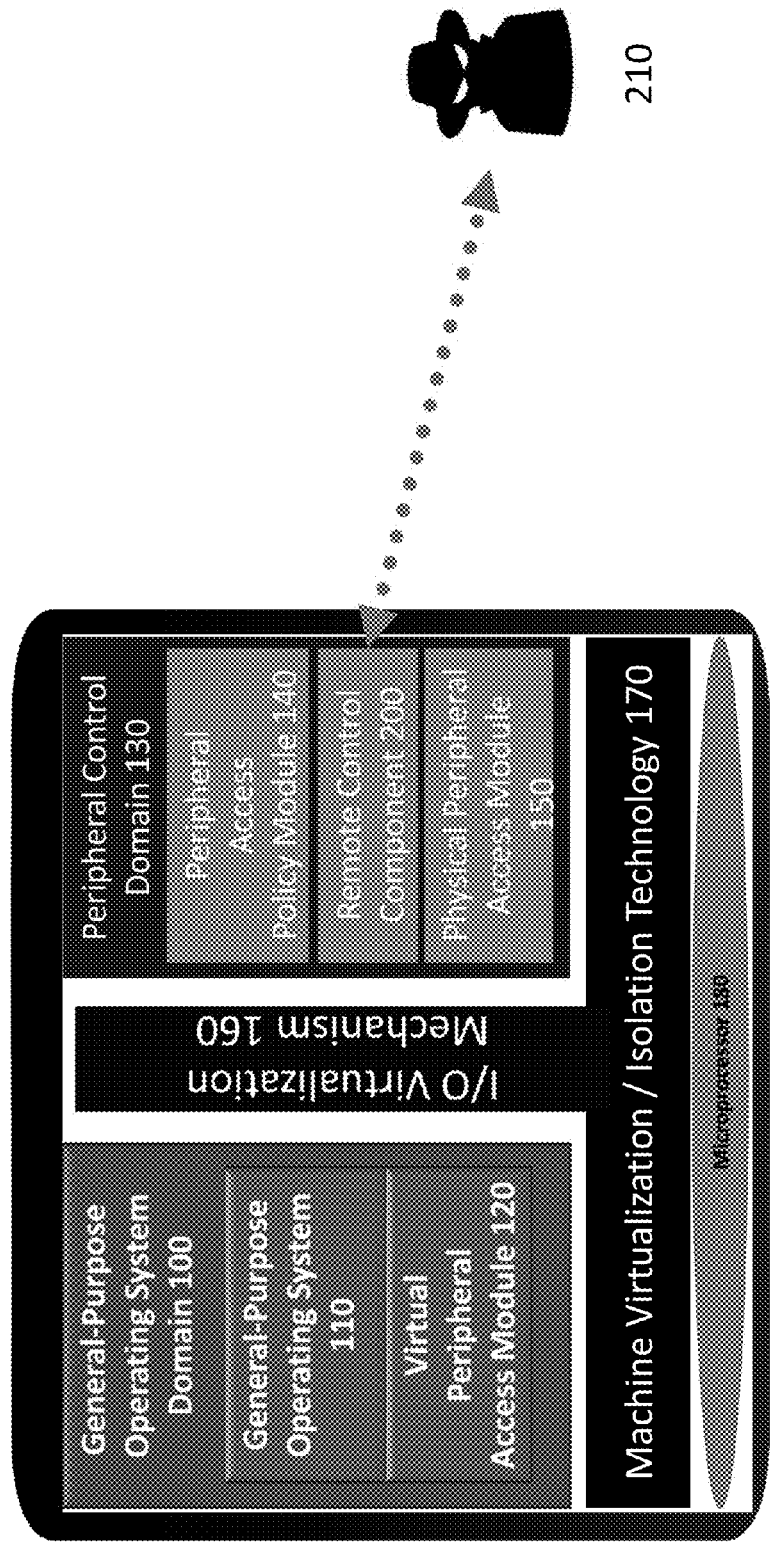
FIG. 2 illustrates a block diagram of a computing device being exploited via virtualization techniques in accordance with certain embodiments.

As shown in FIG. 2, in certain embodiments, virtualization mechanisms used to defend against spying can also be used by attackers 210 as a means to execute spying attacks more effectively. In certain embodiments, attack methods may use the forgoing virtualization mechanisms to surreptitiously activate input peripherals without the user's knowledge or authorization. In certain embodiments, a virtualized network interface may be employed in which all network traffic transiting the portable wireless system is routed through a remote control component 200 within the peripheral control domain 130. This remote control component 200 may be used by an attacker to communicate remotely with the portable device to send it peripheral activation commands. The remote control component 200 can then activate peripherals via the physical peripheral access module 150 without the user or general-purpose operating system's knowledge or authorization. All other network traffic is passed through as normal and expected to the general-purpose operating system domain 100.

In certain embodiments, a method of gaining remote access to a mobile device peripheral is disclosed, comprising: receiving data at a mobile device, the mobile device comprising: at least one portable operating system module; a peripheral control module; a machine virtualization module that isolates the at least one operating system module from the peripheral control module; and an I/O virtualization mechanism interposed between the operating system module and the peripheral control module; determining whether the data comprises a remote control command to a peripheral device; and performing a selected one of: executing the remote control command via the peripheral control module without forwarding the command to the operating system if the data comprises a remote control command to a peripheral device; or passing the data to the operating system if the data does not comprise a remote control command to a peripheral device. The peripheral control module may comprise: a physical peripheral control component; and a policy component for deciding how to handle input peripheral requests originating from the operating system. The machine virtualization mechanism may comprise a Type-1 hypervisor. The machine virtualization mechanism may comprise a Type-2 hypervisor. The machine virtualization mechanism may utilize ARM TrustZone. The machine virtualization mechanism may comprise one of a microkernel and a separation kernel. The method may further comprise: providing one or more alternative virtualized controls that mimic one or more operating system peripheral controls for interfacing to the operating system. The method may further comprise: translating at least one control request and at least one response via a logical communications interface between the operating system module and the peripheral control module. The method may further comprise: detecting an attempt to access at least one physical peripheral; and transferring control of the at least one physical peripheral to said peripheral control module.

In certain embodiments, a method of gaining remote access to a mobile device peripheral is disclosed, comprising: installing a peripheral control module on a mobile device having at least one operating system; installing a machine virtualization module on the mobile device that isolates the operating system module from the peripheral control module; and installing an I/O virtualization mechanism on the mobile device, wherein the I/O virtualization mechanism is interposed between the operating system module and the peripheral control module; receiving data at the mobile device; determining whether the data comprises a remote control command to a peripheral device; and performing a selected one of: executing the remote control command via the peripheral control module without forwarding the command to the operating system if the data comprises a remote control command to a peripheral device; or passing the data to the operating system if the data does not comprise a remote control command to a peripheral device. The peripheral control module may comprise: a physical peripheral control component; and a policy component for deciding how to handle input peripheral requests originating from the operating system. The machine virtualization mechanism may comprise a Type-1 hypervisor. The machine virtualization mechanism may comprise a Type-2 hypervisor. The machine virtualization mechanism may utilize ARM TrustZone. The machine virtualization mechanism may comprise one of a microkernel and a separation kernel.

In certain embodiments, the security-kernel may inform a local user of the input peripheral access attempt and requests approval by using a dialog box on the portable device touch screen. This graphical interface may run on the security-kernel (within the peripheral control domain or yet another domain isolated from the general-purpose operating system domain) and the entire display and touch input system may be virtualized so that this authorization interaction also occurs out-of-band from the portable operating system and may therefore be immune to its vulnerabilities.

Figure 3:
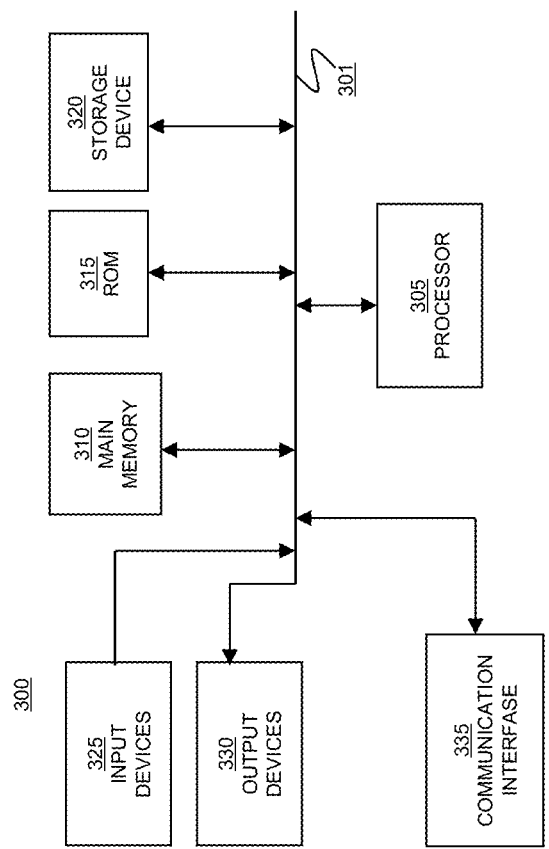
FIG. 3 is an exemplary block diagram of a computing device that may be used to implement aspects of certain embodiments of the present invention.

FIG. 3 is an exemplary diagram of a computing device 300 that may be used to implement aspects of certain embodiments of the present invention. Computing device 300 may include a bus 301, one or more processors 305, a main memory 310, a read-only memory (ROM) 315, a storage device 320, one or more input devices 325, one or more output devices 330, and a communication interface 335. Bus 301 may include one or more conductors that permit communication among the components of computing device 300.

Processor 305 may include any type of conventional processor, microprocessor, or processing logic that interprets and executes instructions. Main memory 310 may include a random-access memory (RAM) or another type of dynamic storage device that stores information and instructions for execution by processor 305. ROM 315 may include a conventional ROM device or another type of static storage device that stores static information and instructions for use by processor 305. Storage device 320 may include a magnetic and/or optical recording medium and its corresponding drive.

Input device(s) 325 may include one or more conventional mechanisms that permit a user to input information to computing device 300, such as a keyboard, a mouse, a pen, a stylus, handwriting recognition, voice recognition, biometric mechanisms, and the like. Output device(s) 330 may include one or more conventional mechanisms that output information to the user, including a display, a projector, an A/V receiver, a printer, a speaker, and the like. Communication interface 335 may include any transceiver-like mechanism that enables computing device/server 300 to communicate with other devices and/or systems. For example, communication interface 335 may include mechanisms for communicating with another device or system via a network.

As described in detail above, computing device 300 may perform operations based on software instructions that may be read into memory 310 from another computer-readable medium, such as data storage device 320, or from another device via communication interface 335. The software instructions contained in memory 310 cause processor 305 to perform processes described below. Alternatively, hard-wired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 300. The web browser may comprise any type of visual display capable of displaying information received via a network, such as Microsoft's Internet Explorer browser, Netscape's Navigator browser, Mozilla's Firefox browser, PalmSource's Web Browser, Google's Chrome browser or any other commercially available or customized browsing or other application software capable of communicating with the network. The computing device 300 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 300 and/or the network. For example, source data or other information received from devices connected to the network may be output via the browser. Also, both the browser and the browser assistant are capable of performing operations on the received source information prior to outputting the source information. Further, the browser and/or the browser assistant may receive user input and transmit the inputted data to devices connected to the network.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

While the above description contains many specifics, these should not be construed as limitations on the scope of the invention, but rather as an exemplification of certain embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A method of gaining remote access to one or more of a mobile device's peripherals, comprising:
   receiving data at the mobile device;
      wherein the mobile device comprising:
      at least one portable operating system domain;
      a peripheral control domain comprising: a peripheral access policy module, a remote control component, and a physical peripheral access module;
      a machine virtualization module that isolates the at least one portable operating system domain from the peripheral control domain; and
      an I/O virtualization mechanism interposed between the at least one portable operating system domain and the peripheral control domain;
   determining by the remote control component of the peripheral control domain whether the data received comprises a remote control command to activate the one or more of the mobile device's peripherals; and
   performing a selected one of:
   executing the remote control command via the physical peripheral access module without forwarding the remote control command to the operating system domain if the data comprises the remote control command to activate the one or more of the mobile device's peripherals; or
   passing the data to the at least one portable operating system domain via the I/O virtualization mechanism if the data does not comprise the remote control command.

2. The method of claim 1, wherein the peripheral control domain comprises:
   a physical peripheral control module; and
   a policy component for deciding how to handle input peripheral requests originating from the at least one portable operating system.

3. The method of claim 1, wherein the machine virtualization module comprises a Type-1 hypervisor.

4. The method of claim 1, wherein the machine virtualization module comprises a Type-2 hypervisor.

5. The method of claim 1, wherein the machine virtualization module utilizes ARM TrustZone.

6. The method of claim 1, wherein the machine virtualization module comprises one of a microkernel and a separation kernel.

7. The method of claim 2, wherein the machine virtualization module comprises a Type-1 hypervisor.

8. The method of claim 2, wherein the machine virtualization module comprises a Type-2 hypervisor.

9. The method of claim 2, wherein the machine virtualization module utilizes ARM TrustZone.

10. The method of claim 2, wherein the machine virtualization module comprises one of a microkernel and a separation kernel.

11. The method of claim 1, further comprising:
providing one or more alternative virtualized controls that mimic one or more operating system peripheral controls for interfacing to the at least one portable operating system.

12. The method of claim 1, further comprising:
transferring at least one control request and at least one response via a logical communications interface between the at least one portable operating system domain and the peripheral control domain.

13. The method of claim 1, further comprising:
detecting an attempt to access at least one or more of a mobile device's peripherals; and
transferring control of the at least one or more of a mobile device's peripherals to said peripheral control domain.

14. A method of gaining remote access to one or more of a mobile device peripherals, comprising:
installing a peripheral control domain comprising: a peripheral access policy module, a remote control component, and a physical peripheral access module on a mobile device having at least one operating system domain;
installing a machine virtualization module on the mobile device that isolates the operating system domain from the peripheral control domain; and
installing an I/O virtualization mechanism on the mobile device, wherein the I/O virtualization mechanism is interposed between the operating system domain and the peripheral control domain;
receiving data at the mobile device;
determining by the remote control component of the peripheral control domain whether the data received comprises a remote control command to activate the one or more of the mobile device peripherals; and
performing a selected one of:
executing the remote control command via the physical peripheral access module without forwarding the remote control command to the operating system domain if the data comprises a remote control command to activate the one or more of the mobile device peripherals; or
passing the data to the at least one portable operating system domain via the I/O virtualization mechanism if the data does not comprise the remote control command.

15. The method of claim 14, wherein the peripheral control domain comprises:
a physical peripheral control module; and
a policy module for deciding how to handle input peripheral requests originating from the operating system.

16. The method of claim 14, wherein the machine virtualization module comprises a Type-1 hypervisor.

17. The method of claim 14, wherein the machine virtualization module comprises a Type-2 hypervisor.

18. The method of claim 14, wherein the machine virtualization module utilizes ARM TrustZone.

19. The method of claim 14, wherein the machine virtualization module comprises one of a microkernel and a separation kernel.

20. The method of claim 14, wherein the machine virtualization module comprises a Type-1 hypervisor.

21. The method of claim 15, wherein the machine virtualization module comprises a Type-2 hypervisor.

22. The method of claim 15, wherein the machine virtualization module utilizes ARM TrustZone.

23. The method of claim 15, wherein the machine virtualization module comprises one of a microkernel and a separation kernel.

* * * * *